May 10, 1966 A. ROSE 3,250,967

SOLID STATE TRIODE

Filed Dec. 22, 1961 2 Sheets-Sheet 1

INVENTOR.
ALBERT ROSE

BY

W.S. Hill
Agent

INVENTOR.
ALBERT ROSE
BY
W. S. Hill
Agent 3,250,967
SOLID STATE TRIODE
Albert Rose, Princeton, N.J., assignor to Radio Corporation of America, a corporation of Delaware
Filed Dec. 22, 1961, Ser. No. 161,731
6 Claims. (Cl. 317—234)

Figure 1:
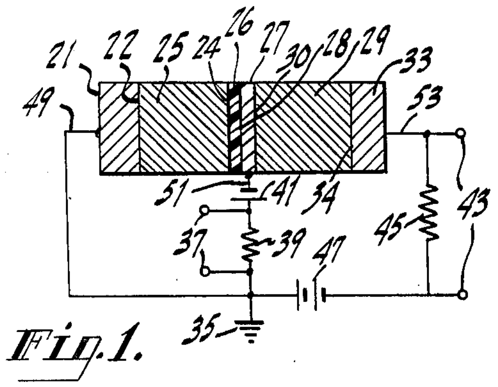

This invention relates to solid state devices, particularly to triodes which may be used for amplifying, switching, and other functions in electronic circuits.

A triode is an electronic device having three terminals. Electric current is made to flow between two of the terminals, which are referred to as anode and cathode, as source and drain, or as emitter and collector. The amount of current flowing between the emitter and collector is controlled by a signal applied to the third terminal, which is referred to as the grid, the control, or the base.

The applicant herein has previously proposed, in copending application Serial No. 26,175, filed May 20, 1960, a triode which comprises an emitter and a collector, each of a bandgap material having the same conductivity type. The emitter and collector each make abrupt blocking contact to opposite sides of a common thin conducting layer or grid, with the collector contact having a lesser barrier height for emitted carriers than the emitter contact. The grid is a conductor composed of a metal or a degenerate semiconductor. The grid is substantially transparent or permeable to free charge carriers emitted from the emitter in the region between the blocking contacts. There are ohmic contacts to each of the emitter, the collector, and the grid.

In operation, the emitter blocking contact is forward biased by a signal voltage applied to the grid with respect to the emitter. The forward bias causes free charge carriers to be emitted into the grid. The density of the carriers emitted into the grid increases with increased signal voltage. Because the grid is substantially transparent to the emitted carriers, the carriers pass through the grid to the collector blocking contact. The collector blocking contact is reverse biased, so that the charge carriers emitted into the grid are collected by the collector and appear as an output current in a load circuit connected across the emitter and the collector. Thus, a relatively small signal voltage applied to the grid controls the flow of a relatively large amount of energy in the form of emitted charge carriers flowing from the emitter to the collector.

In the foregoing device there is a proportion of the emitted charge carriers which are not collected and which pass out through the grid as a leakage current. Such charge carriers are not collected because they have lost sufficient energy, as through electron-electron collisions, that they are unable to pass over the barrier of the collector contact. In order to increase the proportion of emitted charge carriers which are transmitted, it is desirable to increase the energy of the emitted charge carriers so that, on the average, they can experience a larger energy loss and still be collected. This may be achieved by increasing the height of the emitter barrier with respect to the collector barrier. It is also known that too large a difference in the emitter and collector barrier heights also results in a decreased collection of emitted carriers, e.g., through the generation of plasma oscillations in the high density plasma of the metallic grid.

In applicant's previously proposed triode, the optimum difference in the emitter and collector barrier heights may be achieved by a proper selection of the materials of the emitter, grid and collector. In such a selection, the number of materials which may be used for emitter, grid and collector is limited and inevitably requires compromises to be made as to other characteristics. Also, the selected materials may provide a device which is difficult to fabricate or which is expensive compared to other solid state triode devices.

An object of this invention is to provide an improved solid state device.

A further object is to provide an improved solid state triode which may be used for amplifying, switching, and other functions in electronic circuits.

Another object is to provide an improved solid state device of the type described above of improved efficiency, for example, in being capable of collecting a higher proportion of the emitted carriers.

In general, the device of the invention is similar in structure to the previously-proposed device described above, except that a thin layer of an insulator about 10 to 100 A.U. (angstrom units) thick is interposed between the emitter and the grid. By insulator is meant a substantially intrinsic material having a wider bandgap than that of the emitter and having a resistivity greater than $10^{10}$ ohm-cm. The thickness of the insulator is chosen so that significant tunneling of carriers through the insulator does not occur until the desired forward bias is applied between the emitter and the grid. The energy bands in the emitter may, but do not have to be, curved in the region adjacent to the insulator layer. The device of the invention may be operated in the same manner as the previous device, except that the signal voltage which is applied to the emitter is higher and is determined by the voltage required for a significant number of carriers to pass through the insulator layer. Since the insulator material is selected independently of both the emitter material and the grid material, there is a greater freedom in the design of the device for a particular application. Also, the device described herein may be tailored to operate in a particular range of signal voltage and may be optimized to operate at higher frequencies.

Figure 2:
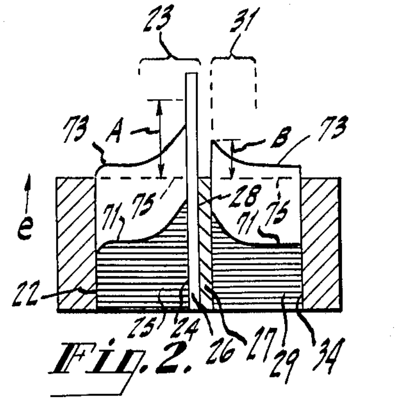
Figure 3:
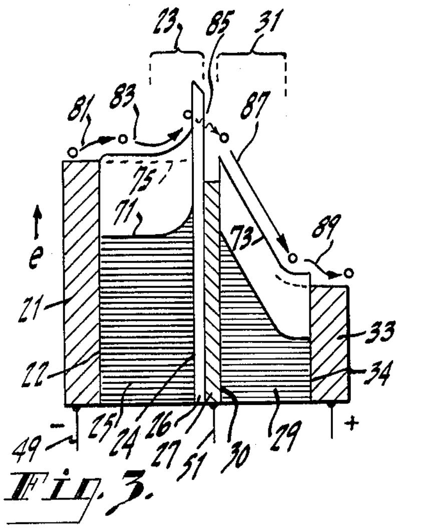
Figure 4:
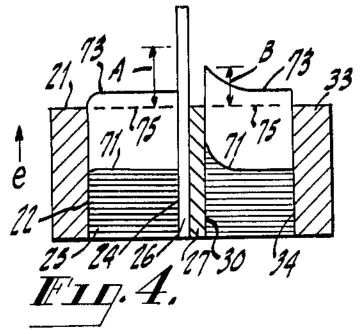
Figure 5:
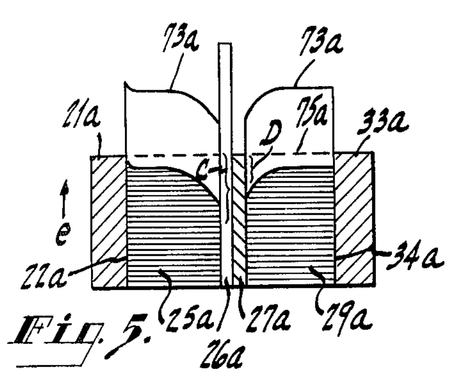

A more detailed description of the invention appears below and various embodiments are illustrated in the drawings in which;

FIGURE 1 is a partially schematic, partially sectional view of a typical embodiment of the invention in a simple amplifier circuit, FIGURE 2 is an energy diagram of an embodiment of the invention at thermal equilibrium with no bias applied; wherein the emitter is an N-type semiconductor in which the energy bands curve upwardly adjacent the insulator layer, FIGURE 3 is an energy diagram of the embodiment of FIGURE 2 as biased for operation as an amplifier in the circuit of FIGURE 1, FIGURE 4 is an energy diagram of an embodiment of the invention at thermal equilibrium with no bias applied; wherein the emitter is an N-type semiconductor in which the energy bands are substantially flat adjacent the insulator layer, FIGURE 5 is an energy diagram of an embodiment of the invention at thermal equilibrum with no bias applied; wherein the emitter is a P-type semiconductor in which the energy bands curve downwardly adjacent the insulator layer.

Figure 6:
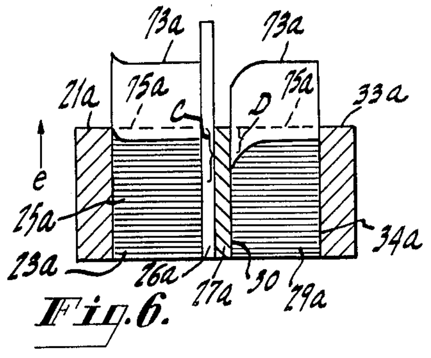

FIGURE 6 is an energy diagram of an embodiment of the invention at thermal equilibrium with no bias applied; wherein the emitter is a P-type semiconductor in which the energy bands are substantially flat adjacent the insulator layer.

Figure 7:
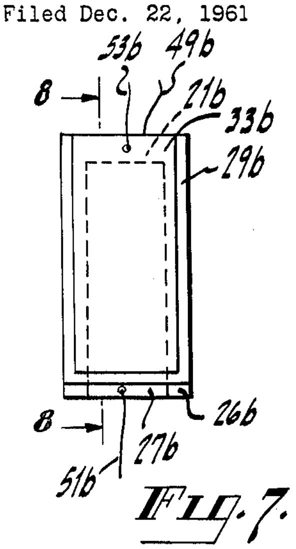
Figure 8:
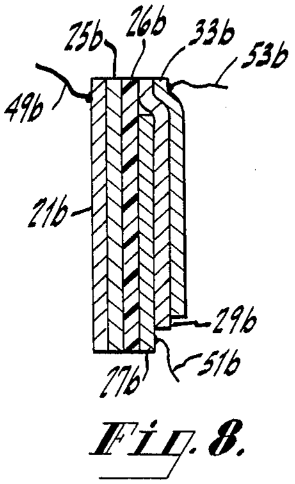
Figure 9:
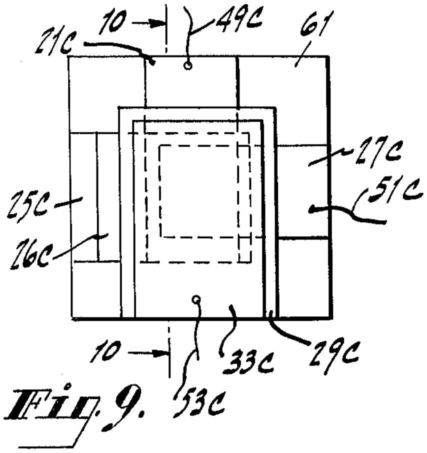
Figure 10:
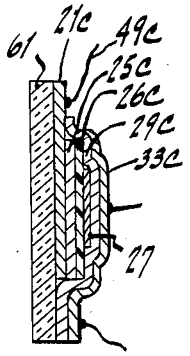
Figure 11:
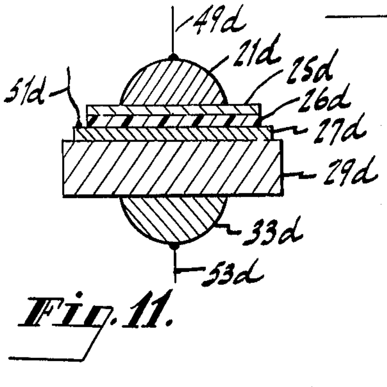

FIGURE 7 is a plan view, and FIGURE 8 is a sectional view along section lines 8—8 of FIGURE 7, of an embodiment of the invention comprising a semiconductor crystal having multiple layers thereon, FIGURE 9 is a plan view, and FIGURE 10 is a sectional view along section lines 10—10 of FIGURE 9, of an embodiment of the invention consisting entirely of multiple layers produced on a passive support, and FIGURE 11 is a sectional view of an embodiment of the invention in which the emitter and collector ohmic contacts are produced by melting and cooling.

Similar reference numerals are used for similar structures throughout the drawings.

In FIGURE 1, a typical embodiment of the invention is shown in a sectional view. The device comprises a plurality of contacting layers as follows: an emitter ohmic contact 21, an emitter region 25, an insulator layer 26, a grid 27, a collector region 29, and a collector ohmic contact 33. The emitter ohmic contact 21 makes an ohmic contact to the emitter region 25, and the collector ohmic contact 33 makes an ohmic contact to the collector region 29.

The emitter and collector regions 25 and 29 are either P-type or N-type conductivity semiconductors, but both regions are of bandgap materials of the same conductivity type. The grid 27 may be a metal or a degenerate semiconductor. Where the emitter and collector regions 25 and 29 have P-type conductivity, the device operates with positive charge carriers, or holes. Where the emitter and collector regions 25 and 29 have N-type conductivity, the device operates with negative charge carriers, or electrons. The devices which operate with holes are the electrical analogues of the devices which operate with electrons. In all cases, the devices herein operate with majority charge carriers.

In the devices described herein, the grid 27 has certain critical characteristics. The grid 27 preferably has a planar structure of uniform thickness. The grid 27 may be a continuous film, or it may have a mesh-like structure. The grid 27 makes blocking contact to the collector region 29. The collector blocking contact is indicated in FIGURE 2 by the structure in the bracket 31. By blocking contact is meant that there is a potential barrier in the contact opposing the flow of majority charge carriers therethrough in one direction. Where the collector region 29 has N-type conductivity, the grid should be of a high work function material. Where the collector region 29 has a P-type conductivity, the grid should be of a low work function material. The grid 27 is preferably a metal or combination of metals. Some low work function metals are indium, gallium, tin, lead and cerium. Some high work function metals are gold, silver, nickel and copper. The grid 27 may also be a semiconductor or other bandgap material which has been doped and in which the doping approaches degeneracy in the semiconductor. Where germanium is the grid material, the free charge carrier concentration is more than $10^{17}$ carriers/cc. and the resistivity is preferably less than $10^{-3}$ (ohm-cm.). Where the grid 27 is a semiconductor, preferably, the semiconductor should have a large band gap to reduce excitation of carriers from the valence band thereof.

Further, the grid 27 should be substantially transparent or permeable to free charge carriers across the thickness thereof between the insulator 26 and the collector region 29. Free charge carriers which pass through the insulator layer 26 have a relatively low energy averaging a few tenths of an electron volt to an electron volt above the Fermi level of the grid 27. These carriers are emitted into the grid 27 and must pass through the grid 27 and be collected at the collector blocking contact 31 without substantial loss in number. Such grid layers may be fabricated from either metals or semiconductors. In the case of metals, the grid 27 is less than 100 A. thick and preferably closer to a few atomic layers thick. Metal layers of this type may be prepared by evaporation or by plating. In the case of semiconductors, the grid 27 may be somewhat thicker up to about 1000 A. thick but is preferably thinner than 1000 A., so as to increase the permeability of the grid 27 to the passage of free charge carriers therethrough.

The collector region 29 may be a bandgap material such as an insulator or semiconductor doped to have a particular conductivity type and a resistivity between $10^{-3}$ and $10^{10}$ ohm-cm. Some suitable semiconductors are cadium sulfide, cadium selenide, cadmium telluride, zinc sulfide, zinc selenide, zinc oxide, lead oxide, germanium and silicon. A feature of the collector region 29 is that it should have electrical characteristics somewhat similar to that of a vacuum as will appear more fully hereinafter. On applying a bias across the collector region 29, an electric field should be produced across the entire collector region 29, such that the carrier current through the collector 29 is proportional to the density of the carriers at the collector blocking contact interface 30 with the grid 27.

FIGURES 1, 2 and 3 further illustrate some of the terminology used in this document. FIGURES 2 and 3 are energy diagrams wherein the ordinate is the energy or potential *e* and the abcissa is the distance along the device of FIGURE 1. The region between the grid 27 and the collector region 29 is referred to as the collector blocking contact interface 30. The collector blocking contact 31 includes the collector blocking contact interface 30 and also a portion of the collector region 29 adjacent the collector blocking contact interface 30 where the energy bands are curved. The collector blocking contact 31 is shown, for example, by the bracketed region 31 on the energy diagrams of FIGURES 2 and 3. The height of the collector potential barrier is shown by the distance B of FIGURE 2.

The collector blocking contact 31 should be abrupt near the collector blocking contact interface 30; that is, the energy levels should change abruptly at the collector blocking contact interface 30. Then, the energy bands immediately within the collector region 29 slope away, down for electrons, up for holes, from the collector blocking contact interface 30. This abruptness and slope is effective to reduce the reflection of charge carriers moving into the collector region 29 back to the grid 27, and to provide rapid removal of collected charge carriers from the interface. Because of the requirement of abruptness, the grid 27 and the collector region 29 are of different materials fabricated by having an abrupt compositional transition.

The function of the collector blocking contact 31 and of the collector region 29 is to provide efficient collection of free charge carriers which have passed through the grid 27. This is achieved by a field distribution which provides a minimum of reflection at the collector blocking contact interface 30 and a rapid removal of free charge carriers, such that the current through the collector region 29 is proportional to the density at the collector blocking contact interface 30. The thickness of the collector region 29 is not critical but, as a matter of convenience, is only a few microns thick.

The grid 27 also contacts the insulator layer 26 which in turn contacts the emitter region 25. The insulator layer 26 functions essentially as a gate or barrier in that it prevents a substantial flow therethrough up to some threshold of emitter-to-grid voltage. Above this threshold, carriers can tunnel through the insulator layer 26 and the insulator layer 26 does not limit the flow of current from the emitter 25 to the grid 27. By insulator is meant that a substantially intrinsic material having a wider bandgap than that of the emitter and having a resistivity greater than $10^{10}$ ohm-cm.

The insulator layer 26 may be of aluminum oxide, such as is produced by oxidation of aluminum metal films; or of silicon dioxide deposited from evaporated material; or of an organic material such as barium stearate on chromium stearate deposited by adsorption to the surface of the emitter region 25 or of the grid 27. The insulator layer 26 is of a thickness to provide the desired threshold of emitter-to-grid voltage, and thin enough to allow appreciable tunneling of charged carriers therethrough above this voltage threshold. Generally, the insulator layer 26 should be of substantially uniform thickness between 10 and 100 A.U. (angstrom units). In the case of aluminum oxide, the insulating layer is preferably 10 to 40 A.U. thick. In the case of barium stearate, the layer is the monomolecular film which is preferably about 40 to 60 A.U. thick. The material of the emitter 25 is selected by the same criterion as that of the collector region 29. The emitter region 25 may be of the same or of a similar bandgap material as that of the collector region 29. The energy bands in the emitter region 23 may, but need not, be curved in the portion adjacent the insulator layer 25. As shown in FIGURES 1, 2, and 3, the contiguous region between the insulator layer 26 and the grid 27 is referred to as the emitter blocking contact interface 28. The emitter blocking contact 23 includes the emitter blocking contact interface 28, the insulator layer 26, and the emitter region-insulator layer interface 24. The height of the energy barrier at the emitter blocking contact 23 is shown by the distance A in FIGURE 2.

The emitter region 25 functions to provide a supply or reservoir of free charge carriers to be emitted into the grid 27. The thickness of the emitter region 25 is not critical, but may vary from a few millimicrons to several mils. The emitter blocking contact 23 provides a means for modulating the density of free charge carriers emitted from the emitter region 25 into the grid 27 according to an input signal voltage applied to the grid 27. The emitted free charge carriers possess sufficient energy to pass through the grid 27 to be collected at the collector blocking contact 31. Accordingly, the energy A for current flow through the emitter blocking contact 23 is higher than the energy of the barrier B in the collector blocking contact 31. An additional advantage of the emitter blocking contact described herein is that the flow of emitted carriers back to the emitter region 25 is reduced. This backflow of carriers usually occurs through the valence bands of the grid 27 and the emitter 25. The insulator layer 26 provides additional isolation between these structures. Another advantage of the emitter blocking contact 23 (shown in FIGURES 2 and 3) is that, in response to a signal, it is capable of modulating the density of charge carriers flowing thereacross without imparting excessive noise to the signal.

An emitter ohmic contact 21 physically contacts the emitter region 25 at emitter ohmic interface 22. Any of the usual materials may be used to produce the emitter ohmic contact 21. If the emitter region 25 is of N-type conductivity, the emitter ohmic contact 21 may be a low work function material, such as indium, gallium, or tin, or combinations thereof. If the emitter region 25 is of P-type conductivity, the emitter ohmic contact 21 may be a high work function material such as copper, gold, silver, nickel, and tellurium or combinations thereof. The collector ohmic contact 33 contacts the collector region 29 at a collector ohmic interface 34. The material of the collector ohmic contact 33 may be selected by the same criterion as that of the emitter ohmic contact 21.

The typical device may be operated as an amplifier in the circuit illustrated in FIGURE 1. The emitter ohmic contact 21 is connected to a ground 35 by an emitter lead 49. The grid 27 is connected to ground 35 through a grid bias means 41, which may be a battery, and a grid resistance 39 connected in series therewith by a grid lead 51. The collector ohmic contact 33 is connected to the ground 35 through a load resistance 45 and a collector bias means 47, which may be a battery, connected in series therewith by a collector lead 53. Input terminals 37 are connected across grid resistance 39. Output terminals 43 are connected across the load resistance 45.

If the emitter and collector regions 25 and 29 are N-type, the grid 27 and the collector ohmic contact 33 are biased to positive polarity; whereas if the emitter and collector regions 25 and 29 are P-type, the grid 27 and the collector ohmic contact 33 are biased to negative polarity. The magnitudes of the bias applied to the grid 27 and collector ohmic contact 33 are generally the same in the two cases.

Assuming the emitter and collector regions 25 and 29 are N-type, a positive bias of about zero to 1 volt is applied to the grid 27 and a positive bias of about 10 to 100 volts is applied to the collector ohmic contact 33. When a signal in the form of a variable voltage which swings the grid voltage between zero and 1 volt in applied to the input terminal 37, an amplified replica of the signal in the form of a variable voltage appears at the output terminals 43.

The internal operation of a device having N-type emitter and collector regions is now explained in connection with FIGURES 2 and 3, which are diagrams plotting energy on the ordinate against distance along the device illustrated in FIGURE 1 on the abscissa. The respective parts are similarly labeled. FIGURE 2 illustrates the device with no bias applied. The significant energy levels of the diagrams are the top of the valence band shown as the lower horizontal line 71 in each of the emitter and collector regions 25 and 29, the bottom of the conduction band is the upper horizontal lines 73 in each of the emitter and collector regions 25 and 29, and the Fermi level shown as the dotted lines 75. A "barrier" refers to the condition where the transfer of carriers thereacross is less probable than elsewhere in the region.

When an operating bias is applied to the device, the positions of the energy bands are changed typically as shown in FIGURE 3. The signal voltage has the effect of changing the density of carriers having an energy A or greater at the emitter-insulator interface 24. Above a voltage threshold, an increased signal voltage produces an increased density of carriers passing across the emitter blocking contact 23, and conversely, a lower signal voltage produces a lower emitted carrier density. The greater the signal voltage, the greater the emitted carrier density. The path of a typical electron across the emitter ohmic contact interface 22 is shown by the arrow 81. And, similarly, the path of a typical electron through the emitter blocking contact 23 is shown by the arrow 83. In passing through the emitter blocking contact 23, emitted carriers pass through the insulator layer 26 by tunneling (also called field emission) as shown by the arrow 85.

It should be noted that an electron coming across the emitter blocking contact 23 has increased energy with respect to the electrons in the system. The grid 27 is fabricated to be transparent or permeable to electrons with such increased energy. Hence, the carriers which pass across the emitter blocking contact 23 pass through the grid 27 to the collector blocking contact 31 as shown also by the arrow 85 without appreciable loss in density. Thus, the density of carriers at the collector blocking interface 30 is substantially proportional to the input signal.

The energy levels 71 and 73 in the collector blocking contact 31 are designed to slope downward sharply away from the collector interface 30. The collector bias has the effect of further steepening this slope and of extending the length of the slope along the region 29. The abrupt slope of the energy bands of the collector blocking contact 31 has the effect of reducing the reflection of energetic electrons from the collector blocking contact 31 back into the grid 27. The slope of the energy levels has the effect of imparting into the collector region 29 the characteristic that the carrier current therethrough is proportional to the barrier density at the collector blocking contact 30. The path of the electron through the collector 29 is shown by the arrow 87. The arrow 89 shows the path of the electron across the collector ohmic contact interface 24 in the conventional manner.

The device draws only a small amount of signal power compared with the available output power. The input has a very low impedance since the emitter is operated in the forward direction of current flow. The output has a very high impedance since the collector is operated in the back direction of current flow, and such that the current to the collector is insensitive to the potential on the collector. The power gain of the device is proportional to the ratio of output impedance to input impedance. A further gain is achieved insofar as the emitter-to-collector current is large compared with the grid current.

FIGURES 2 and 4 are energy diagrams of various device structures of the invention with N-type emitter and collector regions 25 and 29. In FIGURE 2, the grid 27 has a uniform composition and the emitter and collector regions 25 and 29 are of the same or different compositions having different electron affinities. The energy bands in the emitter region 25 may be curved in the portion adjacent the insulator layer 26. In FIGURE 2, these energy bands are shown to curve upward at the contact. However, these energy bands may be flat. In FIGURE 4, these energy bands are shown to be flat. The structure of FIGURE 4 has a slightly higher input capacitance than the structure of FIGURE 2. The two structures are otherwise functionally equivalent.

FIGURES 5 and 6 are energy diagrams of various device structures of the invention made with P-type emitter and collector regions 25 and 29. These devices are electrical analogues of the devices of FIGURES 2 and 4 respectively. One important difference between the devices of FIGURES 5 and 6 and the devices of FIGURES 2 and 4 is that the devices of FIGURES 5 and 6 operate with holes, instead of electrons, as the carriers. Therefore the energy bands and energy steps are in the opposite direction. Since these devices operate with holes, the energy steps C and D correspond to the energy steps A and B respectively of FIGURES 2 and 4. The devices of FIGURES 5 and 6 otherwise correspond to the device of FIGURES 2 and 4 respectively.

In all of the foregoing structures, one problem is to get most of the electrons (or holes) "through" the grid 27 instead of being absorbed by the grid 27. If we think of the grid 27 as a monolayer of metal and if we take the mean free path of an electron (or hole) for energy loss in a metal to be 10 lattice spacings, then about 90% of the current should pass through the grid 27 and into the collector region 29.

The frequency response of this device can be limited by the average transit time of an electron (or hole) from emitter electrode 21 to grid 27 or grid 27 to collector electrode 33. Since the grid-collector voltage is high and the spacing small this transit time is likely to be much less than $10^{-10}$ secs. The transit time from emitter to grid will be given by the relative time in the barrier when it is made positive. For a material of about 1 ohm cm. in the barrier region, this transit time would be about $10^{-12}$ secs. for an electron. Alternatively, one can think of the transit time of electrons through a barrier of say $10^{-1}$ microns. This would be approximately $$\frac{10^{-5}\text{ cm.}}{10^{-7}\text{ cm./sec.}}=10^{-12}\text{ seconds}$$

*Example 1*

FIGURES 7 and 8 illustrate an embodiment of the invention. The device comprises a single crystal 25b about 1.0 x 1.0 x 0.01 cm. thick of cadmium sulfide doped with chlorine to a resistivity of about one ohm-cm. Upon one major surface of the crystal 25b is a thin insulator layer 26b of aluminum oxide about 20 A.U. thick which has thereover a thin electron permeable continuous layer 27b of copper metal about 20 A.U. thick, which has thereover a thin layer 29b of lead oxide doped with excess lead to a resistivity of about one ohm-cm. about 5 microns thick. Identical thin layers 21b and 33b of indium metal are in ohmic contact with the opposite surface of the crystal 25b and with the lead oxide layer 29b respectively.

The thin aluminum oxide layer 26b is prepared by evaporating the aluminum metal on a smooth crystal face of the crystal 25b, and then completely oxidizing the metal layer as by exposure to air or oxygen. The copper metal layer 27b is prepared by evaporating copper metal upon the aluminum oxide layer, which is maintained at a low temperature (e.g. liquid air temperature) to avoid aggregation of the metal atoms and to obtain good conductivity with only a few atomic layers of metal. The lead oxide layer 29b is evaporated on the copper metal layer 27b while it is still at the low temperature in order to fix mechanically the copper metal layer 27b so that it does not aggregate when it is warmed up to room temperature. The two indium metal layers 21b and 33b are also preferably evaporated with the crystal at the low temperatures, as a matter of convenience, although they may be evaporated with the crystal at room temperature.

Emitter, grid and collector leads 49b, 51b and 53b are connected to the indium, copper, and indium metal layers 21b, 27b and 33b respectively, as with metal paste or by pressing a low melting metal into contact. Such device may be operated by applying ground potential to the emitter lead 49b, about 50 volts positive to the collector lead 53b and between about zero and one volt positive to the grid lead 51b.

*Example 2*

FIGURES 9 and 10 illustrate an embodiment of the invention similar to that of the embodiment of FIGURES 7 and 8 except that all of the active structures of the device are thin layers on a support. In particular, the embodiment of FIGURES 9 and 10 comprise a plurality of evaporated layers on one side of a support 61 which may be glass or a ceramic or a metal, in the following order: first layer 21c of indium metal on one side of the support 61, a second layer 25c of highly doped N-type cadmium sulfide: chlorine semiconductor upon the first layer 21c, a third layer 26c of silicon dioxide upon the the second layer 25c, a fourth layer 27c of copper metal on the third layer 26c, a fifth layer 29c of highly doped N-type lead oxide: lead semiconductor on the fourth layer 27c, and a sixth layer 33c of indium metal on the fifth layer 29c. The layers overlie one another in the central area of the device and extend radially in different directions to provide areas for connection. Emitter, grid, and collector leads 49c, 51c and 53c are connected to the first, fourth, and sixth layer 21c, 27c and 33c respectively as in Example 1. If the support 61 is conducting and makes ohmic contact to the second layer 25c, the first layer 21c may be omitted. The embodiment is operated in the manner of the embodiment of Example 1.

*Example 3*

FIGURE 11 illustrates another embodiment of the invention. This embodiment comprises a single crystal 29d having two opposed surfaces of cadmium sulfide doped with chlorine. A thin electron permeable layer 27d of copper metal on one opposed surface. A thin layer 26d of evaporated silicon dioxide 40 A.U. thick on the copper metal layer 27d. A layer 25d of lead doped lead monoxide rests on the silicon dioxide layer 26d. A first droplet 21d of indium metal resides on the lead monoxide layer 25d, and a second droplet 33d of indium metal resides on the other opposed surface of the crystal 29d. Emitter, grid and collector leads 49d, 51d, and 53d are connected to the first indium droplet 21d; the copper layer 27d and the second indium droplet 33d as in Example 1.

The embodiment of FIGURE 11 may be prepared as follows. Select a plate-like crystal 29d of cadmium sulfide doped with chlorine to make it N-type and to have a resistivity of about one ohm-cm. The crystal is about 1.0 cm. by 1.0 cm. by 0.01 cm. thick, thereby providing two major opposed surfaces. Melt a droplet 33d of indium on one opposed surface of the crystal **29*d*. Evaporate a 20 A.U. thick continuous film 27*d* of copper metal upon the other opposed surface of the crystal 29*d* at liquid air temperature. Evaporate a 40 A.U. thick layer 26*d* of silicon dioxide on the copper layer 27*d* at room temperature. Evaporate a 5 micron thick layer 25*d* of lead monoxide on the silicon dioxide layer 26*d* at room temperature. Melt a droplet 21*d* of indium metal on the lead monoxide layer 25*d*. Emitter, grid and collector leads 49*d*, 51*d* and 53*d*** are then soldered in place with a low temperature solder.

There have been described improved solid state devices which may be used for amplifying, switching, and similar function in electronic circuits.

What is claimed is:

1. A solid state device comprising a first body of a bandgap material having a particular conductivity type, a conducting body making abrupt blocking contact to said first body, and means for injecting free charge carriers into said conducting body, said means including a second body of a bandgap material having said particular conductivity type, said second body spaced from said conducting body by a layer of an insulator about 10 to 100 A.U. thick, said conducting body being substantially permeable to said injected free charge carriers between the point of said injection and said blocking contact and ohmic contacts to each of said first body of bandgap material, said second body of bandgap material, and said conducting body.

2. A solid state device comprising a first semiconducting body having a particular conductivity type, a conducting body composed of a metal less than 100 A.U. thick, said conducting body making abrupt blocking contact to said first semiconducting body, and means for injecting free charge carriers into said conducting body, said means including a second semiconducting body having said particular conductivity type, said second semiconducting body spaced from said conducting body by a layer of an insulator about 10 to 100 A.U. thick, said conducting body being substantially permeable to said injected free charge carriers between the point of said injection and said blocking contact and ohmic contacts to each of said first semiconducting body, said second semiconducting body and said conducting body.

3. A solid state device comprising a first semiconducting body having a particular conductivity type, a conducting body composed of a degenerate semiconductor less than 1000 A.U. thick, said conducting body making abrupt blocking contact to said first semiconducting body, and means for injecting free charge carriers into said conducting body, said means including a second semiconducting body having said particular conductivity type, said second semiconducting body spaced from said conducting body by a layer of an insulator about 10 to 100 A.U. thick, said conducting body being substantially permeable to said injected free charge carriers between the point of said injection and said blocking contact and ohmic contacts to each of said first semiconducting body, said second semiconducting body and said conducting body.

4. A solid state device comprising a plurality of layers in the following order, a first layer of a metal, a second layer of a bandgap material having a particular conductivity type in ohmic contact with said first layer, a third layer of a metal of uniform composition less than 100 A.U. thick, in abrupt blocking contact with said second layer, said third layer having a thickness such that said third layer is substantially permeable across its thickness to charge carriers of said particular conductivity type incident on said third layer, a fourth layer about 10 to 100 A.U. thick of an insulator contacting said third layer, a fifth layer of a bandgap material having said particular conductivity type in contact with said fourth layer, and a sixth layer of a metal in ohmic contact with said fifth layer.

5. A solid state device comprising a plurality of layers in the following order: a first layer of a metal, a second layer of a semiconductor having a particular conductivity type in ohmic contact with said first layer, a third layer of a conductor material in abrupt blocking contact with said second layer, said third layer having a thickness such that said third layer is substantially permeable across its thickness to charge carriers of said particular conductivity type emitted into said third layer, a fourth layer about 10 to 100 A.U. thick of an insulator contacting said third layer, a fifth layer of a semiconductor having said particular conductivity type in contact with said fourth layer, and a sixth layer of a metal in ohmic contact with said fifth layer.

6. A solid state device comprising a single crystal semiconductor body having a pair of opposed major surfaces, a first layer of a metal in ohmic contact with one of said major surfaces, a second layer of a conductor material in abrupt blocking contact with the other of said major surfaces, said second layer having a thickness such that said second layer is substantially permeable across its thickness to charge carriers of said particular conductivity type emitted into said second layer, a third layer about 10 to 100 A.U. thick of an insulator contacting said second layer, a fourth layer of a semiconductor having said particular conductivity type in contact with said third layer, and a fifth layer of a metal in ohmic contact with said fourth layer.

References Cited by the Examiner

UNITED STATES PATENTS

| | | | |
|---|---|---|---|
| 1,877,140 | 9/1932 | Lilienfeld | 317—231 |
| 2,208,455 | 7/1940 | Glaser et al. | 317—237 |
| 2,328,440 | 8/1943 | Esseling et al. | 317—241 |
| 2,810,052 | 10/1957 | Bube et al. | 317—237 |
| 2,820,841 | 1/1958 | Carlson et al. | 317—237 |
| 2,854,611 | 9/1958 | Smith | 317—237 |

FOREIGN PATENTS

| | | |
|---|---|---|
| 500,342 | 2/1939 | Great Britain. |

JOHN W. HUCKERT, *Primary Examiner.*

JAMES D. KALLAM, *Examiner.*

E. PUGH, M. EDLOW, *Assistant Examiners.*